(12) United States Patent
Takabayashi et al.

(10) Patent No.: US 11,411,224 B2
(45) Date of Patent: Aug. 9, 2022

(54) SECONDARY BATTERY AND METHOD FOR PRODUCING THE SAME

(71) Applicant: SANYO Electric Co., Ltd., Daito (JP)

(72) Inventors: Hiroshi Takabayashi, Hyogo (JP); Shinichirou Yoshida, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 281 days.

(21) Appl. No.: 16/708,580

(22) Filed: Dec. 10, 2019

(65) Prior Publication Data

US 2020/0243868 A1 Jul. 30, 2020

(30) Foreign Application Priority Data

Jan. 29, 2019 (JP) .............................. JP2019-012632

(51) Int. Cl.
H01M 4/70 (2006.01)
H01M 50/528 (2021.01)
H01M 50/538 (2021.01)
H01M 50/531 (2021.01)
H01M 4/66 (2006.01)
H01M 4/04 (2006.01)
H01M 4/02 (2006.01)

(52) U.S. Cl.
CPC ........... *H01M 4/70* (2013.01); *H01M 4/0471* (2013.01); *H01M 4/661* (2013.01); *H01M 4/667* (2013.01); *H01M 2004/021* (2013.01)

(58) Field of Classification Search
None
See application file for complete search history.

(56) References Cited

U.S. PATENT DOCUMENTS

| 2011/0052976 A1* | 3/2011 | Ishii | H01M 50/528 429/178 |
| 2011/0223454 A1* | 9/2011 | Urano | H01M 50/543 429/94 |
| 2012/0021276 A1* | 1/2012 | Takatsuka | H01M 50/24 429/163 |
| 2012/0070720 A1 | 3/2012 | Aizawa et al. | |

(Continued)

FOREIGN PATENT DOCUMENTS

| JP | 2012-125801 A | 7/2012 |
| JP | 2013-101977 A | 5/2013 |
| JP | 2014-49311 A | 3/2014 |

*Primary Examiner* — Tracy M Dove
(74) *Attorney, Agent, or Firm* — WHDA, LLP

(57) ABSTRACT

A highly reliable secondary battery is provided, in which a short circuit between a positive electrode plate and a negative electrode plate is prevented. The negative electrode plate includes a negative electrode core and a negative electrode active material layer formed on the negative electrode core. An electrode assembly includes a negative electrode core-stacked portion including stacked layers of the negative electrode core, and the negative electrode core-stacked portion is joined to a first surface of the negative electrode current collector to form a joined portion. The irregularity-formed portion is formed on a second surface of the negative electrode current collector that is opposite to the first surface and is located in a portion of the negative electrode current collector in which the joined portion is formed. A sheet member used as a cover member is disposed on the second surface so as to cover the irregularity-formed portion.

6 Claims, 13 Drawing Sheets

(56) References Cited

U.S. PATENT DOCUMENTS

2015/0147598 A1* 5/2015 Inoue .................... H01M 4/661
                                                                           429/7
2015/0236369 A1    8/2015 Takatsuka et al.
2018/0040918 A1* 2/2018 Guen .................. H01M 50/581

* cited by examiner

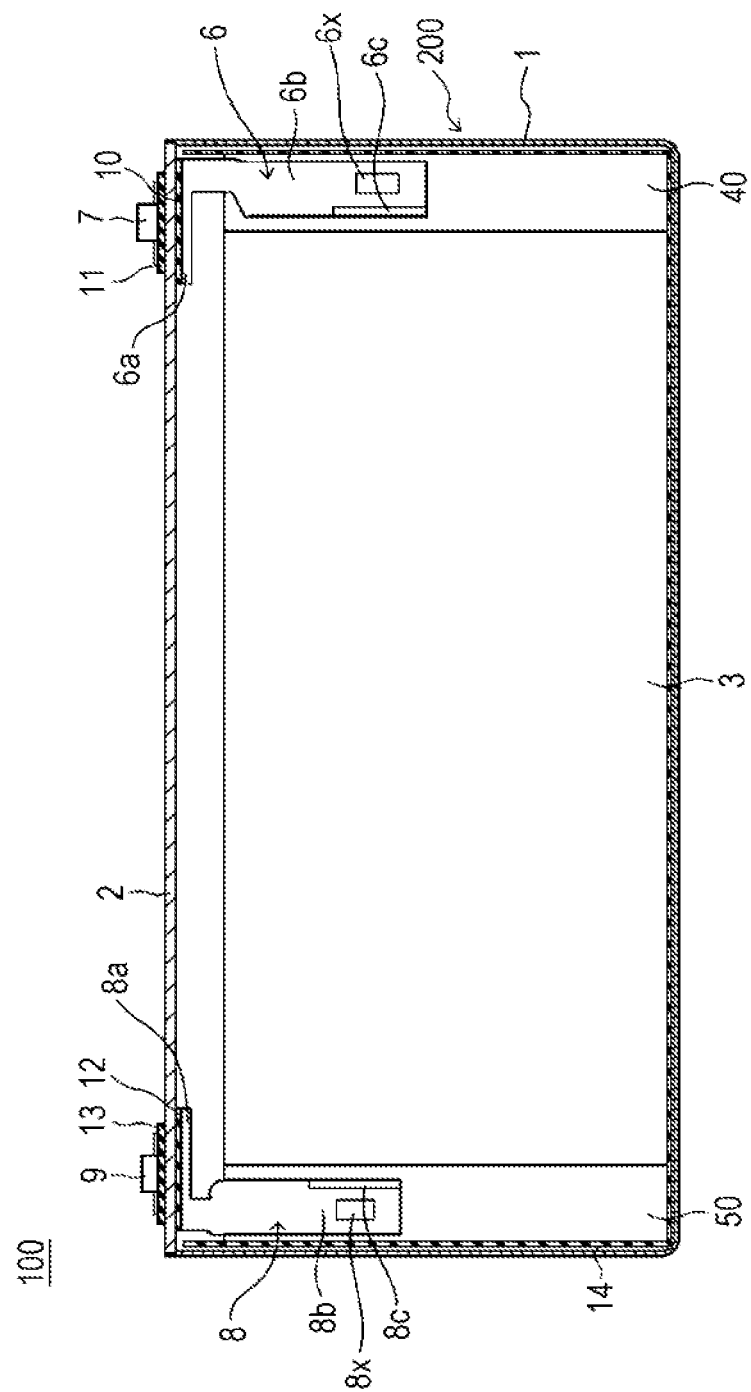

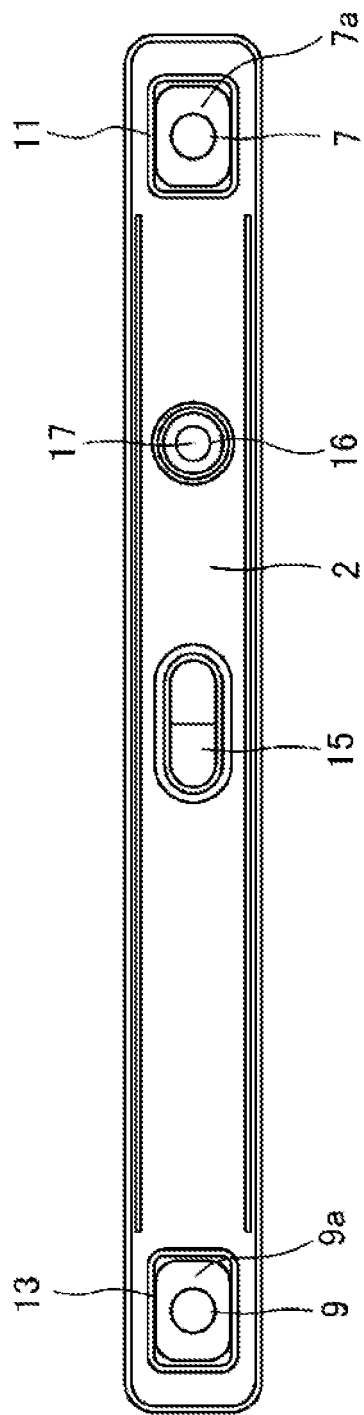

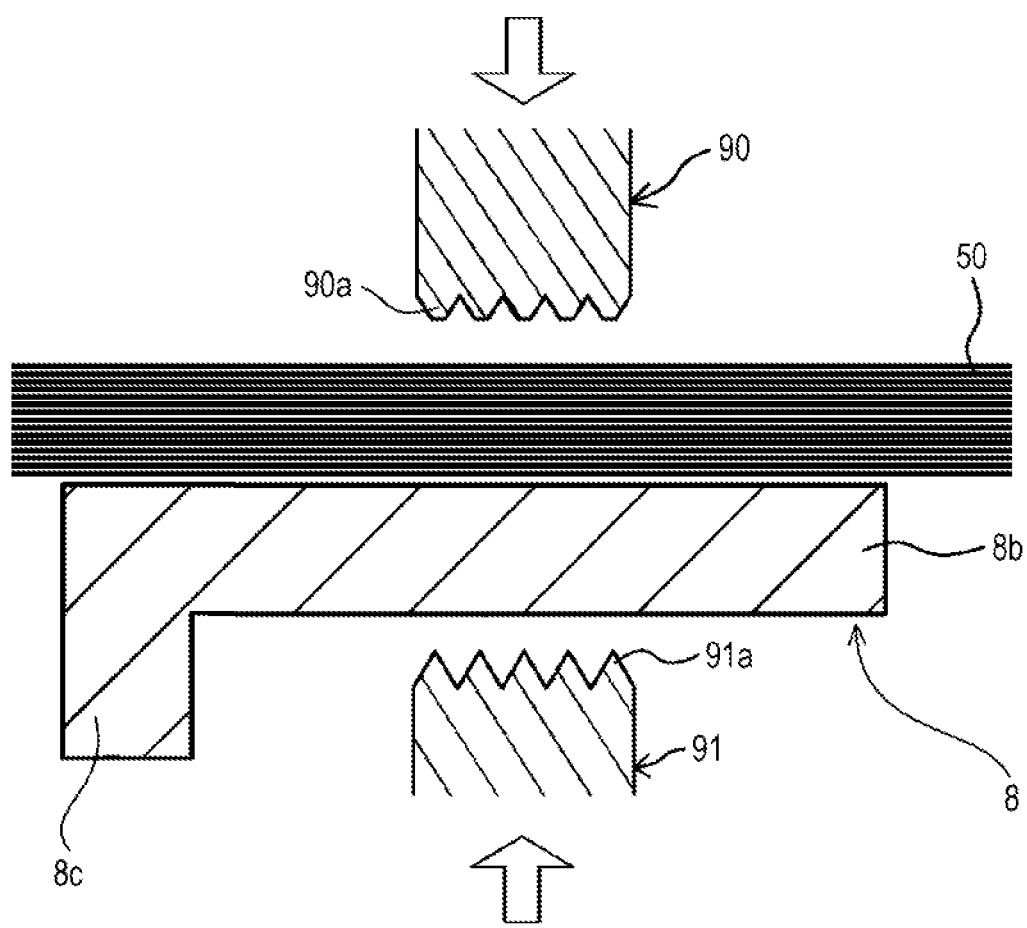

SECONDARY BATTERY AND METHOD FOR PRODUCING THE SAME

CROSS REFERENCE TO RELATED APPLICATIONS

The present invention application claims priority to Japanese Patent Application No. 2019-012632 filed in the Japan Patent Office on Jan. 29, 2019, the entire contents of which are incorporated herein by reference.

BACKGROUND OF THE INVENTION

Field of the Invention

The present disclosure relates to a secondary battery and to a method for producing the same.

Description of Related Art

A secondary battery such as a lithium ion secondary battery has a structure in which an electrode assembly including a positive electrode plate and a negative electrode plate and an electrolyte are housed in a battery case. The positive electrode plate and the negative electrode plate included in the electrode assembly are prepared by forming respective active material layers on the surfaces of respective metal-made cores. Core-exposed portions formed in the positive and negative electrode plates are electrically connected through current collectors to respective terminals attached to the battery case.

One known method for joining a core and a current collector together is ultrasonic bonding. In the ultrasonic bonding, the core and the current collector stacked together are sandwiched between a horn and an anvil, and vibration energy of ultrasonic waves is applied to the joint surface.

To sandwich the core and the current collector in a reliable manner, a plurality of projections are formed on the surfaces of the horn and anvil.

For example, Japanese Published Unexamined Patent Application No. 2012-125801 (Patent Document 1) discloses a method in which an arc-shaped projection is formed on the surface of a horn and in which a margin region with no projection formed therein is provided in a peripheral region of the horn.

BRIEF SUMMARY OF THE INVENTION

One object of the present disclosure is to provide a secondary battery in which a short circuit between a positive electrode plate and a negative electrode plate is prevented.

A secondary battery in one aspect of the present disclosure includes:

a first electrode plate;

a second electrode plate having a polarity different from the polarity of the first electrode plate;

an electrode assembly including the first electrode plate and the second electrode plate;

a first electrode current collector electrically connected to the first electrode plate; and a cover member, wherein the first electrode plate includes a first electrode core and a first electrode active material layer formed on the first electrode core, wherein the electrode assembly includes a first electrode core-stacked portion in which the first electrode core is stacked, wherein the first electrode core-stacked portion is joined to a first surface of the first electrode current collector to thereby form a joined portion, wherein the first electrode current collector has an irregularity-formed portion that is formed on a second surface opposite to the first surface and located in a portion in which the joined portion is formed, and wherein the cover member is disposed on the second surface so as to cover the irregularity-formed portion.

The inventors have conducted studies on small metal pieces (dust) generated in the joined portion after a plurality of stacked layers of the core and the current collector have been ultrasonically bonded together. The inventors have noticed that small metal pieces larger than the thickness of the core are present. Then the inventors have conducted detailed analysis and found that the small metal pieces larger than the core thickness are not metal pieces peeled from the core but are metal pieces chipped from the current collector.

In the structure of the secondary battery in the above aspect, small metal pieces present in the vicinity of the irregularity-formed portion of the current collector are effectively prevented from moving from the vicinity of the irregularity-formed portion and entering the electrode assembly. Therefore, a short circuit between the positive electrode plate and the negative electrode plate is prevented, and the secondary battery is highly reliable. The first electrode plate may be the positive electrode plate or may be the negative electrode plate.

A secondary battery production method in another aspect of the present disclosure is a method for producing a secondary battery including a first electrode plate, a second electrode plate having a polarity different from the polarity of the first electrode plate, an electrode assembly including the first electrode plate and the second electrode plate, a first electrode current collector electrically connected to the first electrode plate, and a cover member, wherein the first electrode plate includes a first electrode core and a first electrode active material layer formed on the first electrode core, the method including:

an electrode assembly production step of producing the electrode assembly having a first electrode core-stacked portion in which the first electrode core is stacked;

an ultrasonic bonding step of sandwiching the first electrode core-stacked portion and the first electrode current collector between an anvil and a horn and then ultrasonically boding the first electrode core-stacked portion and the first electrode current collector together, wherein an irregularity-formed portion is formed in a portion of the first electrode current collector, the portion being brought into contact with the anvil; and a cover member connecting step of, after the ultrasonic bonding step, connecting the cover member to the first electrode current collector such that the cover member covers the irregularity-formed portion.

The secondary battery production method in the above aspect can produce a secondary battery in which small metal pieces present in the vicinity of the irregularity-formed portion of the current collector are effectively prevented from moving from the vicinity of the irregularity-formed portion and entering the electrode assembly. Therefore, a short circuit between the positive electrode plate and the negative electrode plate is prevented, and the secondary battery is highly reliable.

BRIEF DESCRIPTION OF THE SEVERAL VIEWS OF THE DRAWINGS

FIG. 1 is a schematic front view showing the interior of a prismatic secondary battery according to an embodiment with a front portion of a prismatic outer casing and a front portion of an insulating sheet removed.

FIG. 2 is a top view of the prismatic secondary battery according to the embodiment.

FIG. 4 is a cross-sectional view of a negative electrode current collector and a negative electrode core-stacked portion in the embodiment, showing the state before the negative electrode current collector and the negative electrode core-stacked portion are sandwiched between a horn and an anvil.

DETAILED DESCRIPTION OF THE INVENTION

Figure 3A:
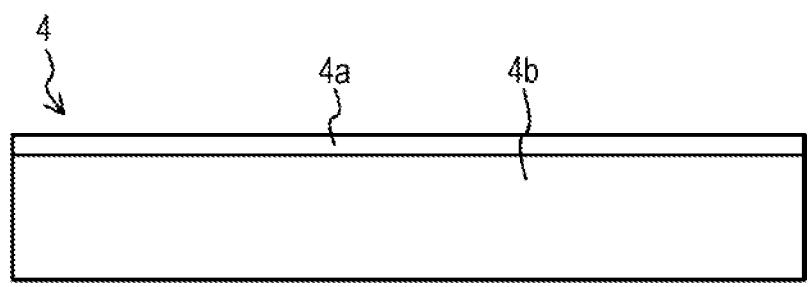
FIG. 3A is a plan view of a positive electrode plate in the embodiment.

A prismatic secondary battery 100, which is a secondary battery according to an embodiment of the present disclosure, will be described with reference to the drawings. The scope of the present disclosure is not limited to the following embodiment, and the embodiment can be freely modified within the technical idea of the present disclosure.

The structure of the prismatic secondary battery 100 according to the embodiment will be described. As shown in FIGS. 1 and 2, the prismatic secondary battery 100 includes: a prismatic outer casing 1 having an upper opening; and a sealing plate 2 that seals the opening. The prismatic outer casing 1 and the sealing plate 2 form a battery case 200. The prismatic outer casing 1 and the sealing plate 2 are each made of metal and are preferably made of, for example, aluminum or an aluminum alloy. A strip-shaped positive electrode plate and a strip-shaped negative electrode plate are wound with a strip-shaped separator therebetween to form a flattened wound electrode assembly 3. The electrode assembly 3 and a non-aqueous electrolyte (not shown) are housed in the prismatic outer casing 1. A resin-made insulating sheet 14 is disposed between the prismatic outer casing 1 and the electrode assembly 3. A gas release valve 15 is disposed in the sealing plate 2. The gas release valve 15 breaks when the pressure inside the battery case 200 reaches a prescribed value or higher to thereby release the gas inside the battery case 200 to the outside thereof. An electrolyte injection hole 16 is provided in the sealing plate 2 and is sealed with a sealing member 17.

As shown in FIG. 3A, the positive electrode plate 4 includes a metallic positive electrode core 4a and a positive electrode active material layer 4b formed on both sides of the positive electrode core 4a. The positive electrode plate 4 has a positive electrode core-exposed portion which is located in an edge portion, with respect to the width direction of the positive electrode plate 4, of the positive electrode core 4a and extends in the length direction of the positive electrode plate 4 and in which no positive electrode active material layer 4b is formed on both sides of the positive electrode core 4a. Preferably, the positive electrode core 4a is made of aluminum or an aluminum alloy. The positive electrode active material layer 4b contains a positive electrode active material. The positive electrode active material used is, for example, a lithium-transition metal complex oxide. Preferably, the positive electrode active material layer 4b contains a binder and a conductive agent. Preferably, the binder is a resin-made binder, and polyvinylidene fluoride, for example, may be used. Preferably, the conductive agent is a carbon material such as carbon black.

Figure 3B:
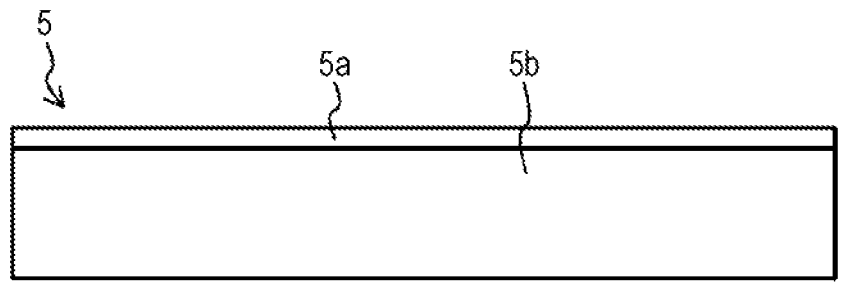
FIG. 3B is a plan view of a negative electrode plate in the embodiment.

As shown in FIG. 3B, the negative electrode plate 5 includes a metallic negative electrode core 5a and a negative electrode active material layer 5b formed on both sides of the negative electrode core 5a. The negative electrode plate 5 has a negative electrode core-exposed portion which is located in an edge portion, with respect to the width direction of the negative electrode plate 5, of the negative electrode core 5a and extends in the length direction of the negative electrode core 5a and in which no negative electrode active material layer 5b is formed on both sides of the negative electrode core 5a. Preferably, the negative electrode core 5a is made of copper or a copper alloy. The negative electrode active material layer 5b contains a negative electrode active material. The negative electrode active material used is, for example, a carbon material such as graphite or amorphous carbon or a silicon material such as silicon or silicon oxide. Preferably, the negative electrode active material layer 5b contains a binder. Preferably, the binder is a resin-made binder and contains, for example, styrene-butadiene rubber (SBR) and carboxymethyl cellulose (CMC). The negative electrode active material layer 5b may optionally contain a conductive agent.

The wound-type electrode assembly 3 has the wound positive electrode core-exposed portion in one edge portion and the wound negative electrode core-exposed portion in the other edge portion. The wound positive electrode core-exposed portion forms a positive electrode core-stacked portion 40 including stacked layers of the positive electrode core 4a. The wound negative electrode core-exposed portion forms a negative electrode core-stacked portion 50 including stacked layers of the negative electrode core 5a.

A positive electrode current collector 6 is connected to the positive electrode core-stacked portion 40. The positive electrode current collector 6 is connected to a positive electrode terminal 7 mounted on the sealing plate 2. A resin-made inner insulating member 10 is disposed between the sealing plate 2 and the positive electrode current collector 6. A resin-made outer insulating member 11 is disposed between the sealing plate 2 and the positive electrode terminal 7. The positive electrode current collector 6 and the positive electrode terminal 7 are electrically insulated from the sealing plate 2 by the inner insulating member 10 and the outer insulating member 11. The positive electrode current collector 6 and the positive electrode terminal 7 are made of metal and preferably made of aluminum or an aluminum alloy.

A negative electrode current collector 8 is connected to the negative electrode core-stacked portion 50. The negative electrode current collector 8 is connected to a negative electrode terminal 9 mounted on the sealing plate 2. A resin-made inner insulating member 12 is disposed between the sealing plate 2 and the negative electrode current collector 8. A resin-made outer insulating member 13 is disposed between the sealing plate 2 and the negative electrode terminal 9. The negative electrode current collector 8 and the negative electrode terminal 9 are electrically insulated from the sealing plate 2 by the inner insulating member 12 and the outer insulating member 13. The negative electrode current collector 8 and the negative electrode terminal 9 are made of metal and preferably made of, for example, copper or a copper alloy. Preferably, the negative electrode terminal 9 includes a portion made of copper or a copper alloy and a portion made of aluminum or an aluminum alloy. Preferably, the portion of the negative electrode terminal 9 that is made of copper or a copper alloy is connected to the negative electrode current collector 8 made of copper or a copper alloy, and the portion of the negative electrode terminal 9 that is made of aluminum or an aluminum alloy is exposed to the outside from the sealing plate 2.

The positive electrode terminal 7 includes a flange portion 7a disposed on the battery outer side of the sealing plate 2 and an insertion portion (not shown) formed on one surface of the flange portion 7a. The insertion portion passes through a positive electrode terminal mounting hole (not shown) provided in the sealing plate 2 and is connected to the positive electrode current collector 6.

The negative electrode terminal 9 includes a flange portion 9a disposed on the battery outer side of the sealing plate 2 and an insertion portion (not shown) formed on the one surface of the flange portion 9a. The insertion portion passes through a negative electrode terminal mounting hole (not shown) provided in the sealing plate 2 and is connected to the negative electrode current collector 8.

The positive electrode current collector 6 and the positive electrode terminal 7 may be electrically connected to each other through another conductive member. The negative electrode current collector 8 and the negative electrode terminal 9 may be electrically connected to each other through another conductive member.

The positive electrode current collector 6 includes: a base portion 6a disposed between the sealing plate 2 and the electrode assembly 3; and a lead portion 6b extending from an edge portion of the base portion 6a toward the electrode assembly 3. The positive electrode terminal 7 is connected to the base portion 6a. The lead portion 6b is joined to the positive electrode core-stacked portion 40. A rib 6c is provided at an edge, with respect to the width direction, of the lead portion 6b. The rib 6c may be omitted.

The negative electrode current collector 8 includes: a base portion 8a disposed between the sealing plate 2 and the electrode assembly 3; and a lead portion 8b extending from an edge portion of the base portion 8a toward the electrode assembly 3. The negative electrode terminal 9 is connected to the base portion 8a. The lead portion 8b is joined to the negative electrode core-stacked portion 50. A rib 8c is provided at an edge, with respect to the width direction, of the lead portion 8b. The rib 8c may be omitted.

The lead portion 6b of the positive electrode current collector 6 has an irregularity-formed portion 6x that is formed on a surface opposite to the surface joined to the positive electrode core-stacked portion 40 and located in a portion joined to the positive electrode core-stacked portion 40. The irregularity-formed portion 6x is formed by anvil projections of an anvil that dig into the positive electrode current collector 6 when the positive electrode current collector 6 and the positive electrode core-stacked portion 40 are ultrasonically bonded together. Specifically, the irregularity-formed portion 6x includes indentations formed by the anvil.

The lead portion 8b of the negative electrode current collector 8 has an irregularity-formed portion 8x that is formed on a surface opposite to the surface joined to the negative electrode core-stacked portion 50 and located in a portion joined to the negative electrode core-stacked portion 50. The irregularity-formed portion 8x is formed by the anvil projections of the anvil that dig into the negative electrode current collector 8 when the negative electrode current collector 8 and the negative electrode core-stacked portion 50 are ultrasonically bonded together. Specifically, the irregularity-formed portion 8x includes indentations formed by the anvil.

[Mounting of Components on Sealing Plate]

A method for mounting the positive electrode current collector 6, the positive electrode terminal 7, the negative electrode current collector 8, and the negative electrode terminal 9 on the sealing plate 2 will next be described.

First, the outer insulating member 11 is placed on the battery outer side of the sealing plate 2 in a region around the positive electrode terminal mounting hole (not shown) provided in the sealing plate 2, and the inner insulating member 10 and the base portion 6a of the positive electrode current collector 6 are placed on the inner surface side of the sealing plate 2. Next, the insertion portion of the positive electrode terminal 7 is inserted from the battery outer side into a through hole of the outer insulating member 11, the positive electrode terminal mounting hole of the sealing plate 2, a through hole of the inner insulating member 10, and a through hole of the base portion 6a, and then a forward end portion of the insertion portion of the positive electrode terminal 7 is crimped to the base portion 6a. In this manner, the positive electrode terminal 7, the outer insulating member 11, the sealing plate 2, the inner insulating member 10, and the positive electrode current collector 6 are integrally fixed together. The crimped portion at the forward end of the insertion portion of the positive electrode terminal 7 may be welded to the base portion 6a.

Similarly, the outer insulating member 13 is placed on the battery outer side of the sealing plate 2 in a region around the negative electrode terminal mounting hole (not shown) provided in the sealing plate 2, and the inner insulating member 12 and the base portion 8a of the negative electrode current collector 8 are placed on the battery inner side of the sealing plate 2. Next, the insertion portion of the negative electrode terminal 9 is inserted from the battery outer side into a through hole of the outer insulating member 13, the negative electrode terminal mounting hole of the sealing plate 2, a through hole of the inner insulating member 12, and a through hole of the base portion 8a, and a forward end portion of the insertion portion of the negative electrode terminal 9 is crimped to the base portion 8a. In this manner, the negative electrode terminal 9, the outer insulating member 13, the sealing plate 2, the inner insulating member 12, and the negative electrode current collector 8 are integrally fixed together. The crimped portion at the forward end of the insertion portion of the negative electrode terminal 9 may be welded to the base portion 8a.

[Assembly of Prismatic Secondary Battery 100]

The positive electrode current collector 6 mounted on the sealing plate 2 is joined to the positive electrode core-stacked portion 40, and the negative electrode current collector 8 mounted on the sealing plate 2 is joined to the negative electrode core-stacked portion 50. Then the electrode assembly 3 is covered with the insulating sheet 14, and the electrode assembly 3 covered with the insulating sheet 14 is inserted into the prismatic outer casing 1. The sealing plate 2 is laser-welded to the prismatic outer casing 1 to seal the opening of the prismatic outer casing 1 with the sealing plate 2. A non-aqueous electrolyte is injected from the electrolyte injection hole 16 of the sealing plate 2 into the battery case 200, and then the electrolyte injection hole 16 is sealed with the sealing member 17. The prismatic secondary battery 100 is thereby prepared.

A method for joining a current collector to a core-stacked portion will be described using, as an example, a method for joining the negative electrode current collector 8 to the negative electrode core-stacked portion 50. A method for joining the positive electrode current collector 6 to the positive electrode core-stacked portion 40 is similar to the above method.

[Joining of Current Collector to Core-Stacked Portion]

Figure 5:
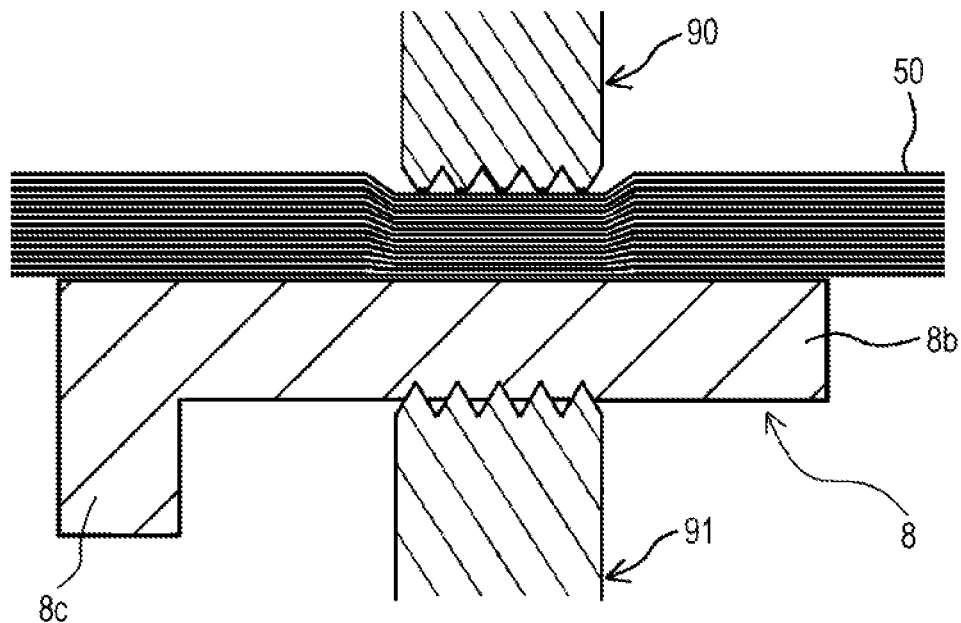
FIG. 5 is a cross-sectional view of the negative electrode current collector and the negative electrode core-stacked portion in the embodiment, showing the state after the negative electrode current collector and the negative electrode core-stacked portion have been sandwiched between the horn and the anvil.
Figure 6:
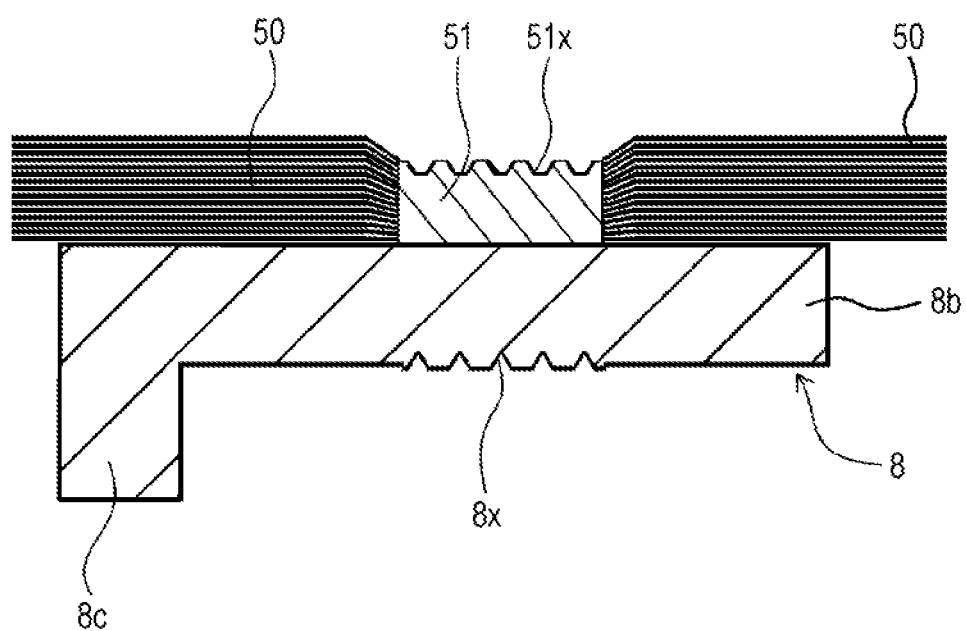
FIG. 6 is a cross-sectional view of the negative electrode current collector and the negative electrode core-stacked portion in the embodiment, showing the state after the negative electrode current collector and the negative electrode core-stacked portion have been ultrasonically bonded together.

FIGS. 4 to 6 are cross-sectional views of the lead portion 8b, the negative electrode core-stacked portion 50, a horn 90, and an anvil 91 that are taken in the width direction of the lead portion 8b (the left-right direction in FIG. 1).

As shown in FIG. 4, the negative electrode core-stacked portion 50 is disposed on one side of the lead portion 8b. The negative electrode core-stacked portion 50 and the lead portion 8b are sandwiched between the horn 90 and the anvil 91. The horn 90 has a plurality of horn projections 90a at its forward end. The horn projections 90a are brought into contact with the negative electrode core-stacked portion 50. The anvil 91 has a plurality of anvil projections 91a at its forward end. The anvil projections 91a are brought into contact with the lead portion 8b.

As shown in FIG. 5, by sandwiching the negative electrode core-stacked portion 50 and the lead portion 8b between the horn 90 and the anvil 91, the horn projections 90a dig into the negative electrode core-stacked portion 50, and the anvil projections 91a dig into the lead portion 8b. By applying ultrasonic vibrations to the horn 90, the stacked layers of the negative electrode core 5a in the negative electrode core-stacked portion 50 are joined together, and the negative electrode core-stacked portion 50 and the lead portion 8b are joined together, as shown in FIG. 6. A joined portion 51 is thereby formed in the negative electrode core-stacked portion 50.

A core-side irregularity-formed portion 51x is formed on the surface of the joined portion 51. The irregularity-formed portion 8x, which includes indentations formed by the anvil 91, is formed in the lead portion 8b.

Figure 7:
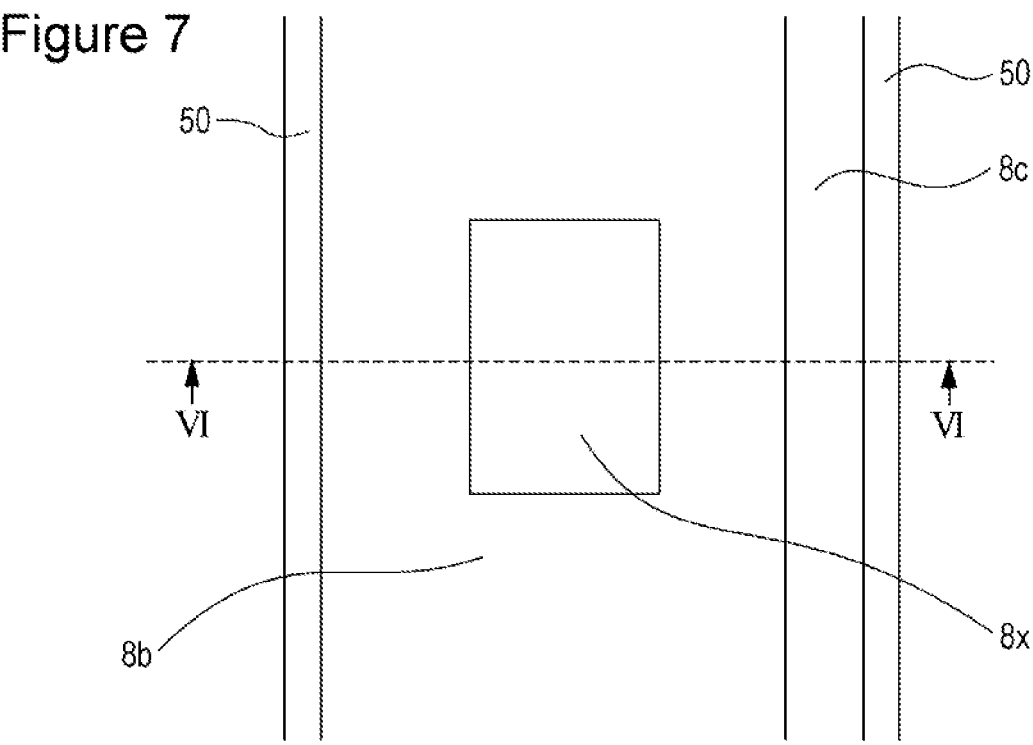
FIG. 7 is a plan view of the negative electrode current collector and the negative electrode core-stacked portion in the embodiment after ultrasonic bonding.

FIG. 7 is a plan view of a surface of the lead portion 8b after the negative electrode core-stacked portion 50 and the lead portion 8b have been ultrasonically bonded together, the surface being opposite to the surface to which the negative electrode core-stacked portion 50 is joined. The irregularity-formed portion 8x, which includes indentations formed by the anvil 91, is formed on a portion of the lead portion 8b that is opposite to the portion on which the joined portion 51 is formed. FIG. 6 is a cross-sectional view taken along VI-VI in FIG. 7.

Figure 8:
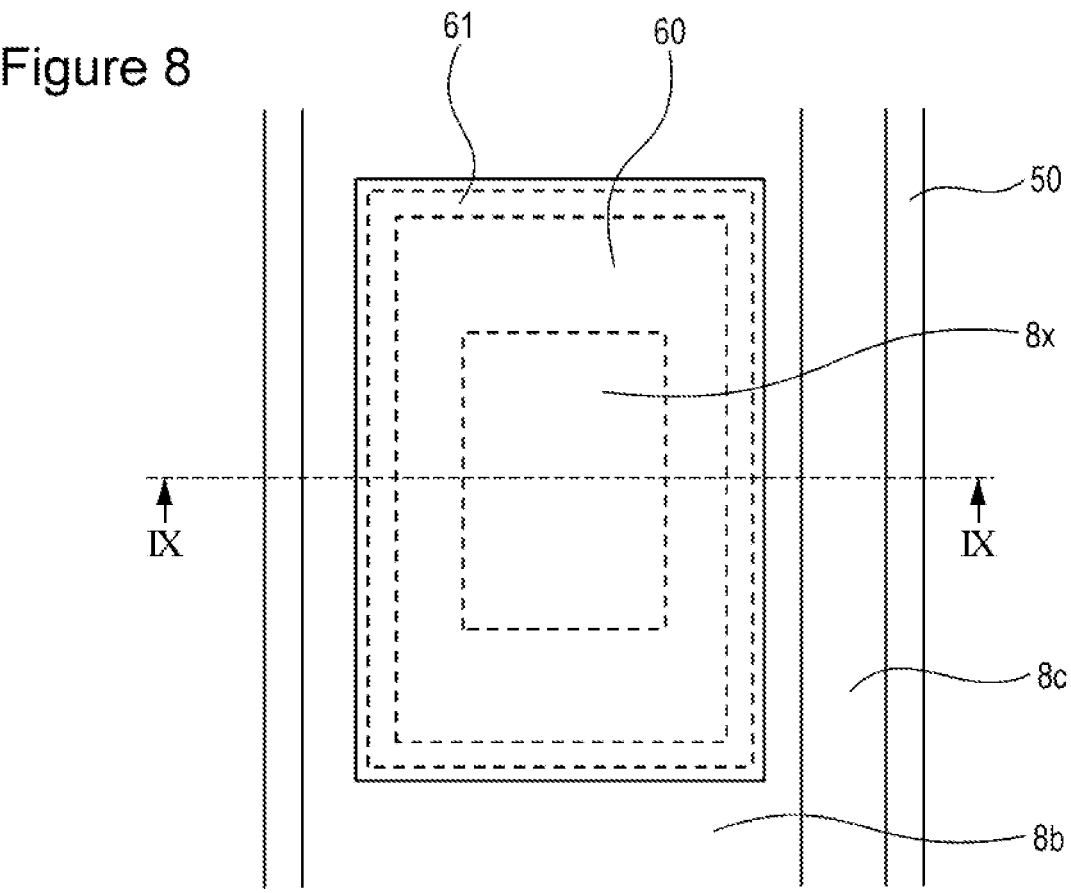
FIG. 8 is a plan view of the negative electrode current collector and the negative electrode core-stacked portion after a sheet member has been disposed.
Figure 9:
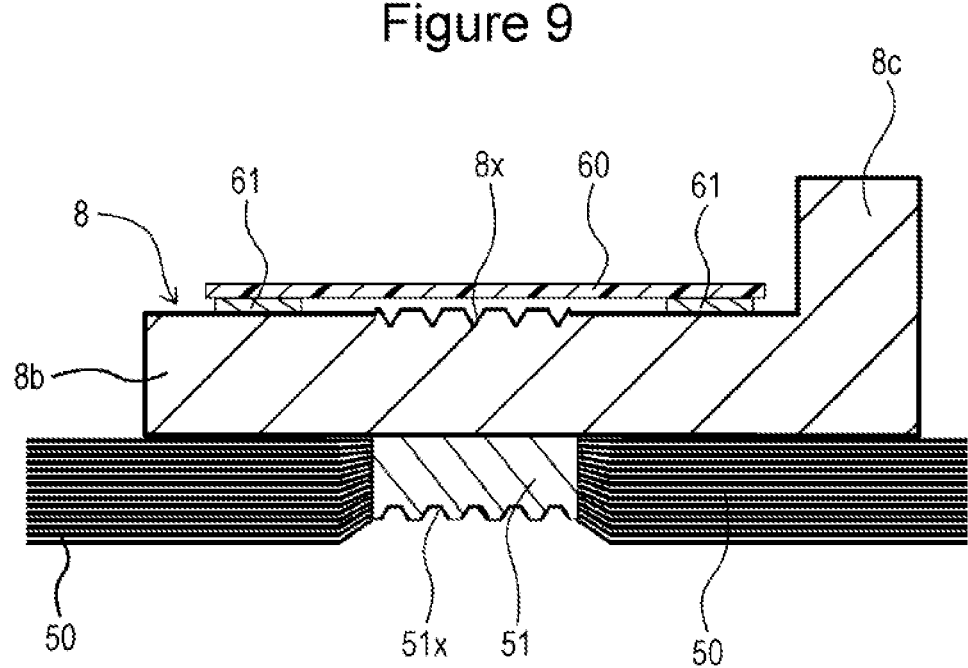
FIG. 9 is a cross-sectional view taken along IX-IX in FIG. 8.

Next, as shown in FIGS. 8 and 9, a sheet member 60 used as a cover member is connected to the lead portion 8b so as to cover the irregularity-formed portion 8x. In this case, even when small metal pieces are present in the vicinity of the irregularity-formed portion 8x, the small metal pieces are prevented from moving from the irregularity-formed portion 8x to the electrode assembly 3. FIG. 9 is a cross-sectional view taken along IX-IX in FIG. 8.

Figure 10A:
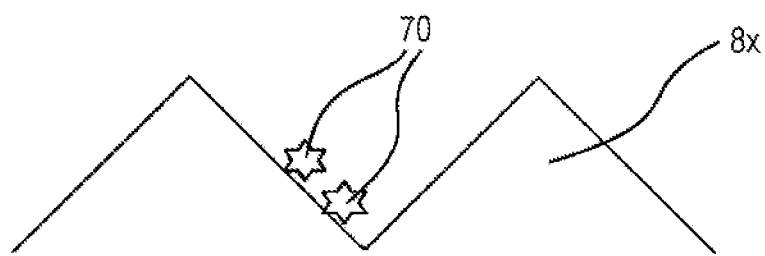
FIGS. 10A and 10B are enlarged cross-sectional views of an irregularity-formed portion.
Figure 10B:
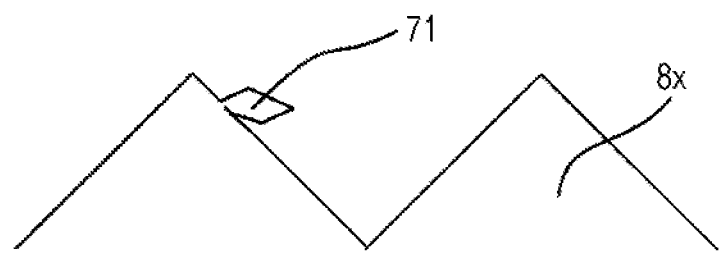

Small metal pieces present in the vicinity of the irregularity-formed portion 8x may include the following metal pieces. As shown in FIG. 10A, during ultrasonic bonding, the anvil 91 may chip off part of the lead portion 8b, and the small metal chips 70 may adhere to the irregularity-formed portion 8x. As shown in FIG. 10B, during ultrasonic bonding, the anvil 91 may partially cut the lead portion 8b to thereby form burrs 71. The burrs 71 may be separated from the lead portion 8b to form small metal pieces.

The sheet member 60 in the embodiment is connected to the lead portion 8b through a bonding layer 61. The bonding layer 61 has an annular shape in plan view and is disposed so as to surround the irregularity-formed portion 8x. Therefore, a gap extending in the thickness direction of the lead portion 8b (the thickness direction of the sheet member 60) is formed between the sheet member 60 and the irregularity-formed portion 8x. As shown in FIG. 9, the sheet member 60 is not in contact with the irregularity-formed portion 8x.

The irregularity-formed portion 8x is formed by the anvil 91 that digs into the lead portion 8b during ultrasonic bonding. The surface of the irregularity-formed portion 8x is not flat. In some cases, part of the irregularity-formed portion 8x protrudes from the surface of the lead portion 8b around the irregularity-formed portion 8x (in FIG. 9, part of the irregularity-formed portion 8x protrudes upward from the upper surface of the lead portion 8b). Therefore, when the sheet member 60 is disposed on the surface of the irregularity-formed portion 8x, the sheet member 60 may not be disposed stably on the lead portion 8b. For example, large wrinkles may be formed in the sheet member 60, and a large unintended gap may be formed between the sheet member 60 and the surroundings of the irregularity-formed portion 8x in the lead portion 8b.

In the structure in the above embodiment, the sheet member 60 can be connected to the lead portion 8b so as not to come into contact with the irregularity-formed portion 8x. Therefore, the sheet member 60 can be stably connected to the lead portion 8b.

No bonding layer 61 is formed in a portion of the sheet member 60 that faces the irregularity-formed portion 8x. In this structure, the amount of the bonding layer 61 can be reduced, and the amount of the non-aqueous electrolyte absorbed by the bonding layer 61 can be reduced. Therefore, the useless amount of the non-aqueous electrolyte not involved in the battery reaction can be reduced. It is more preferable that a region in which no bonding layer 61 is formed is provided around the outer circumferential edges of the sheet member 60, as shown in FIGS. 8 and 9.

[Modification 1]

Figure 11:
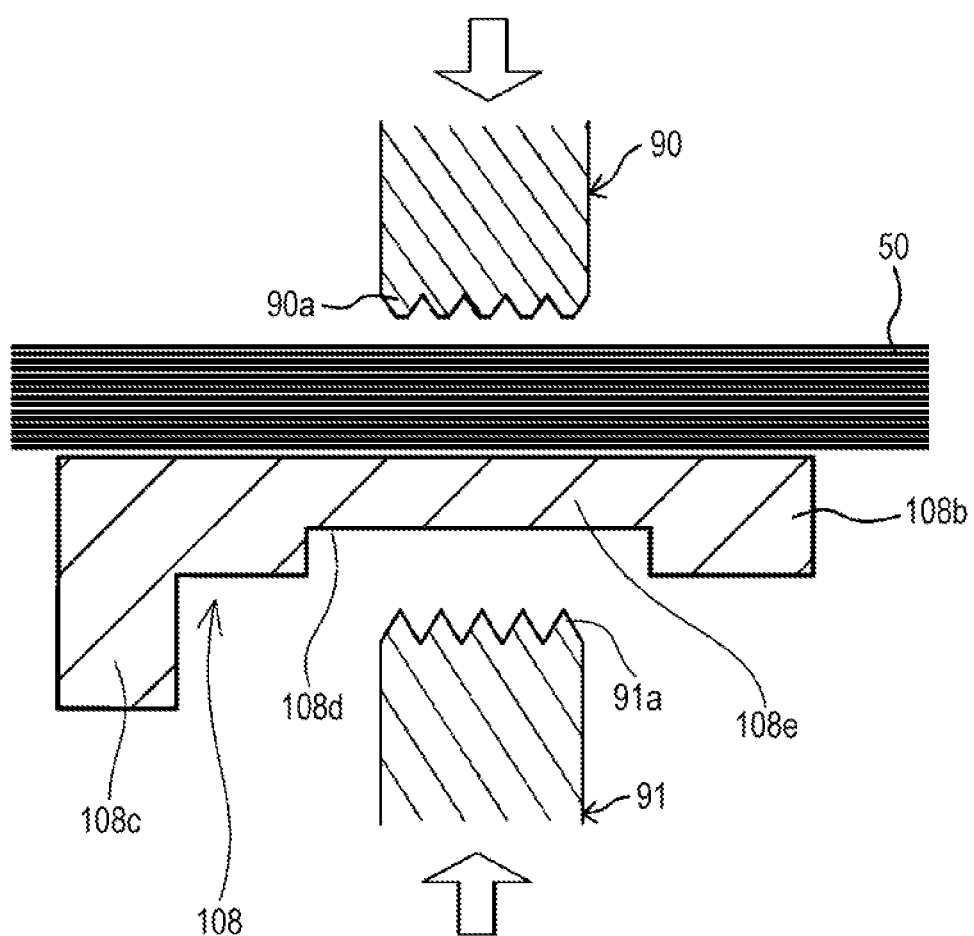
FIG. 11 is a cross-sectional view of a negative electrode current collector and a negative electrode core-stacked portion in modification 1, showing the state before the negative electrode current collector and the negative electrode core-stacked portion are sandwiched between the horn and the anvil.
Figure 12:
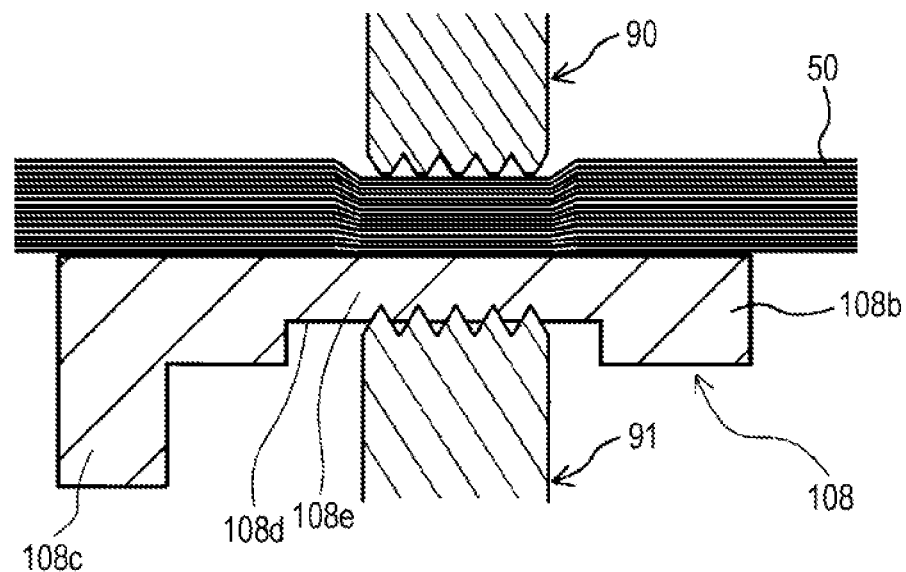
FIG. 12 is a cross sectional view of the negative electrode current collector and the negative electrode core-stacked portion in modification 1, showing the state after the negative electrode current collector and the negative electrode core-stacked portion have been sandwiched between the horn and the anvil.

FIGS. 11 to 16 show a mode of joining a negative electrode current collector and a negative electrode core-stacked portion in modification 1. In modification 1, the shape of the lead portion of the negative electrode current collector differs from that in the above embodiment. In the negative electrode current collector 108 in modification 1, a recess 108d is provided on a surface of the lead portion 108b that is opposite to the surface facing the negative electrode core-stacked portion 50. A thin-walled portion 108e is thereby formed in the lead portion 108b. The negative electrode current collector 108 has a rib 108c at an edge, with respect to the width direction, of the lead portion 108b. FIGS. 11 and 12 are cross-sectional views of the lead portion 108b, the negative electrode core-stacked portion 50, the horn 90, and the anvil 91 that are taken in the width direction of the lead portion 108b (the left-right direction in FIG. 1).

As shown in FIG. 11, the negative electrode core-stacked portion 50 is disposed on a surface of the lead portion 108b that is opposite to the surface on which the recess 108d is formed. Then the negative electrode core-stacked portion 50 and the lead portion 108b are sandwiched between the horn 90 and the anvil 91.

As shown in FIG. 12, the anvil 91 is brought into contact with the bottom surface of the recess 108d formed in the lead portion 108b. The anvil projections 91a of the anvil 91 thereby dig into the bottom surface of the recess 108d.

Figure 13:
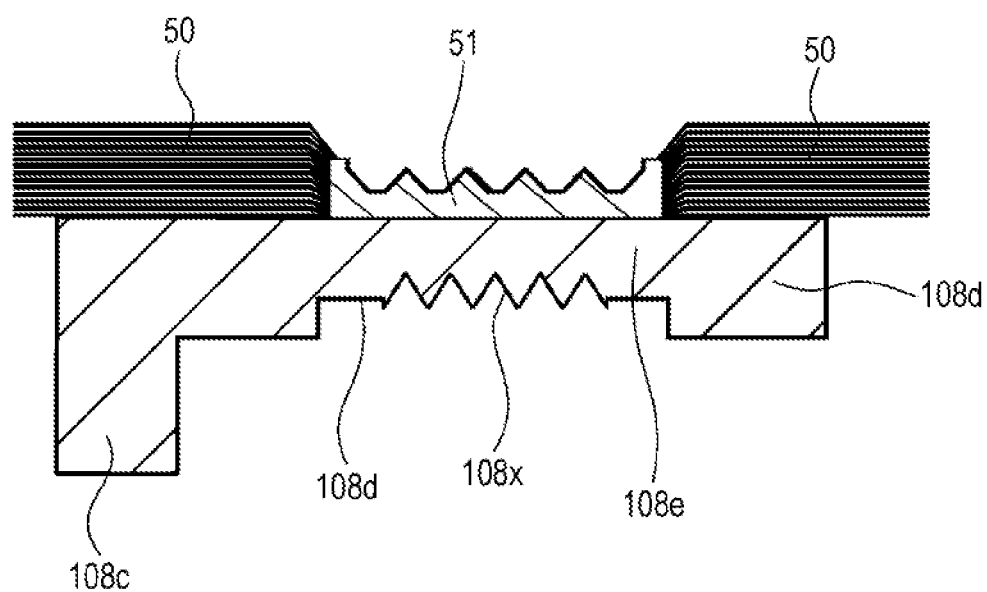
FIG. 13 is a cross sectional view of the negative electrode current collector and the negative electrode core-stacked portion in modification 1, showing the state after the negative electrode current collector and the negative electrode core-stacked portion have been ultrasonically bonded together.

As a result of the ultrasonic bonding, the lead portion 108b and the negative electrode core-stacked portion 50 are joined together in the thin-walled portion 108e of the lead portion 108b as shown in FIG. 13. The joined portion 51 is thereby formed. An irregularity-formed portion 108x, which includes indentations formed in the lead portion 108b by the anvil 91, is formed on the bottom surface of the recess 108d.

Figure 14:
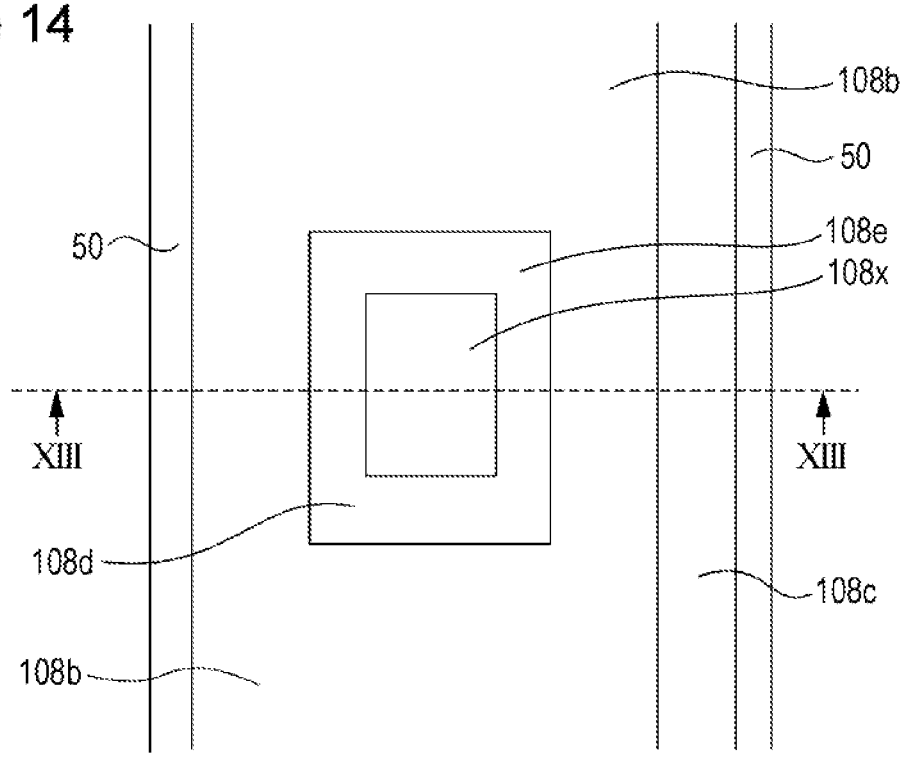
FIG. 14 is a plan view of the negative electrode current collector and the negative electrode core-stacked portion in modification 1 after ultrasonic bonding.

FIG. 14 is a plan view of a surface of the lead portion 108b after the negative electrode core-stacked portion 50 and the lead portion 108b have been ultrasonically bonded together, the surface being opposite to the surface to which the negative electrode core-stacked portion 50 is joined. The irregularity-formed portion 108x, which includes indentations formed by the anvil 91, is formed on a portion of the lead portion 108b that is opposite to the portion on which the joined portion 51 is formed. FIG. 13 is a cross-sectional view taken along XIII-XIII in FIG. 14.

Figure 15:
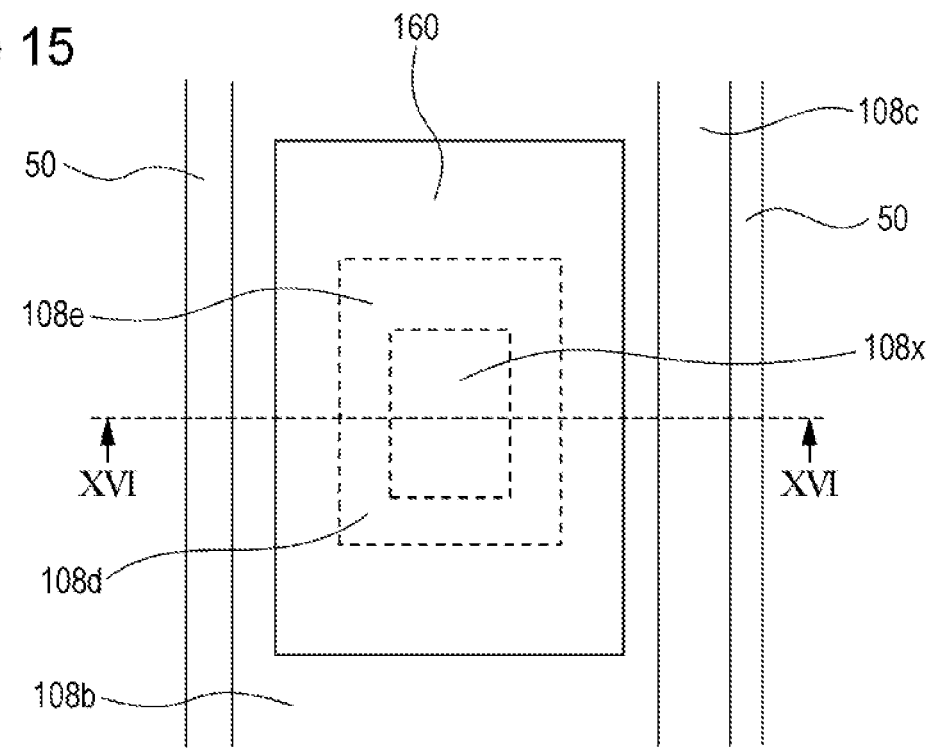
FIG. 15 is a plan view of the negative electrode current collector and the negative electrode core-stacked portion after a sheet member has been disposed.
Figure 16:
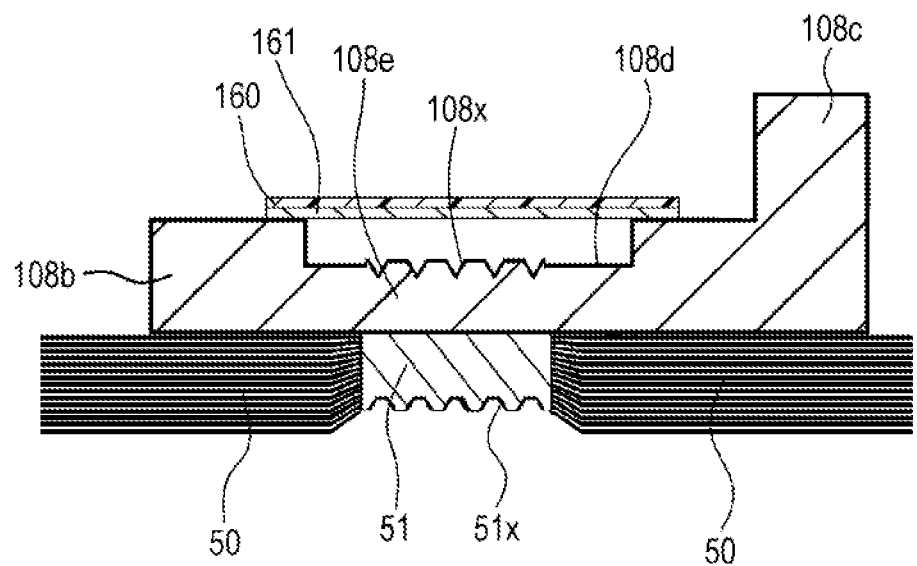
FIG. 16 is a cross-sectional view taken along XVI-XVI in FIG. 15.

Next, as shown in FIGS. 15 and 16, a sheet member 160 used as a cover member is connected to the lead portion 108b so as to cover the irregularity-formed portion 108x. In this case, even when small metal pieces are present in the vicinity of the irregularity-formed portion 108x, the small metal pieces can be prevented from moving from the irregularity-formed portion 108x to the electrode assembly 3. FIG. 16 is a cross-sectional view taken along XVI-XVI in FIG. 15.

The sheet member 160 in modification 1 is connected to the lead portion 108b through a bonding layer 161. The sheet member 160 is connected around the recess 108d of the lead portion 108b through the bonding layer 161. Therefore, a gap extending in the thickness direction of the lead portion 108b (the thickness direction of the sheet member 160) is formed between the bonding layer 161 and the irregularity-formed portion 108x. Specifically, the sheet member 160 can be connected to the lead portion 108b such that the bonding layer 161 does not come into contact with the irregularity-formed portion 108x.

The irregularity-formed portion 108x is formed by the anvil 91 that digs into the lead portion 108b during ultrasonic bonding. The surface of the irregularity-formed portion 108x is not flat. Therefore, when the sheet member 160 is disposed on the surface of the irregularity-formed portion 108x, the sheet member 160 may not be disposed stably on the lead portion 108b. For example, large wrinkles may be formed in the sheet member 160, and a large unintended gap may be formed between the sheet member 160 and the surroundings of the irregularity-formed portion 108x in the lead portion 108b.

In the structure in modification 1, the sheet member 160 can be connected to the lead portion 108b so as not to come into contact with the irregularity-formed portion 108x. Therefore, the sheet member 160 can be stably connected to the lead portion 108b.

[Sheet Member]

Preferably, the sheet member used as a cover member is made of a resin. Preferably, the sheet member is formed from, for example, a material selected from polypropylene, polyimide, polyphenylene sulfide, polyethylene, polyester, polyethylene naphthalate, etc. or a mixture thereof. The sheet member may be a metal foil or a glass sheet.

No particular limitation is imposed on the thickness of the sheet member, but the thickness is, for example, preferably 5 μm or more, more preferably 10 μm or more, and still more preferably 20 μm or more. The thickness of the sheet member is preferably 1 mm or less and more preferably 0.5 mm or less.

A base layer of a tape including the base layer and a bonding layer may be used as the sheet member.

Preferably, the bonding layer formed in the sheet member has adhesiveness at room temperature (25°). The bonding layer may be heat bondable. Preferably, the bonding layer is formed from a material selected from rubber-based adhesives, acrylic-based adhesives, polyethylene-based adhesives, etc. or a mixture thereof. Particularly preferably, the bonding layer is formed from a rubber-based adhesive.

[Modification 2]

Figure 17:
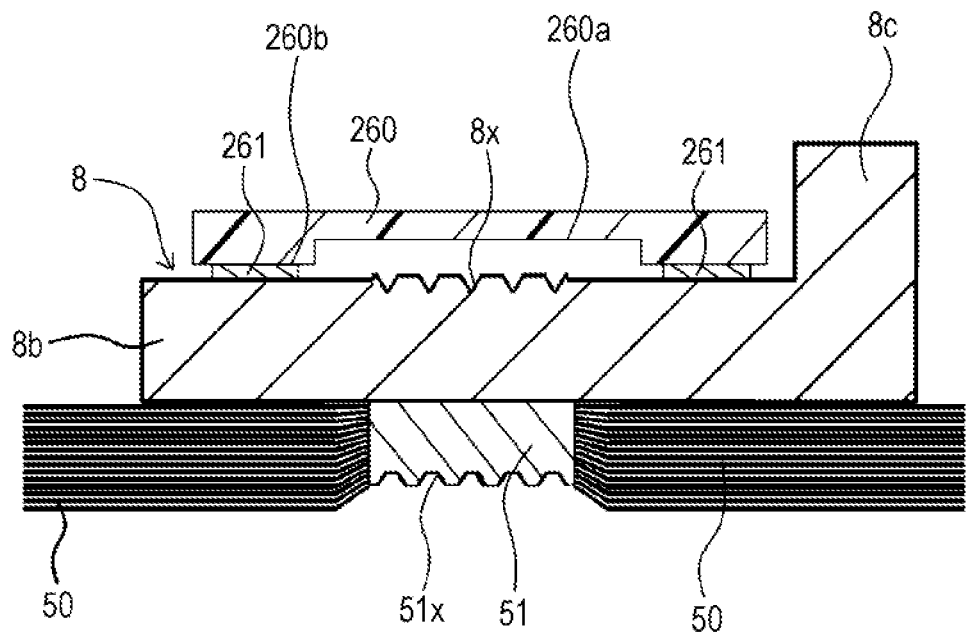
FIG. 17 is a cross-sectional view in the vicinity of the joined portion between the negative electrode current collector and the negative electrode core-stacked portion in modification 2.

FIG. 17 is a cross-sectional view in the vicinity of a joined portion between a lead portion of a negative electrode current collector and a negative electrode core-stacked portion in modification 2 after a cover member has been attached. FIG. 17 is a cross-sectional view corresponding to FIG. 9 for the above embodiment.

Modification 2 differs from the above embodiment only by the structure of the cover member. In modification 2, a plate-shaped member 260 used as the cover member has a plate-shaped member recess 260a on a surface facing the irregularity-formed portion 8x. In the plate-shaped member 260, a peripheral portion 260b located around the plate-shaped member recess 260a is connected to the lead portion 8b of the negative electrode current collector 8 through a bonding layer 261. The peripheral portion 260b is formed into an annular shape so as to surround the irregularity-formed portion 8x. The peripheral portion 260b is connected around the irregularity-formed portion 8x. The plate-shaped member 260 and the irregularity-formed portion 8x are spaced apart from each other in the thickness direction of the lead portion 8b. Preferably, the plate-shaped member 260 is made of a resin.

[Modification 3]

Figure 18:
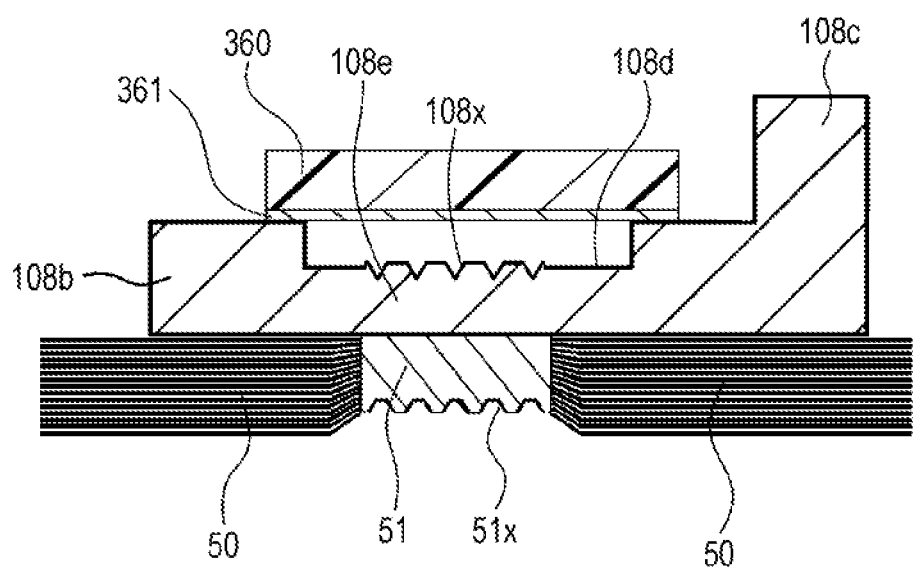
FIG. 18 is a cross-sectional view in the vicinity of the joined portion between the negative electrode current collector and the negative electrode core-stacked portion in modification 3.

FIG. 18 is a cross-sectional view in the vicinity of a joined portion between a lead portion of a negative electrode current collector and a negative electrode core-stacked portion in modification 3 after a cover member has been attached. FIG. 18 is a cross-sectional view corresponding to FIG. 16 for modification 1.

Modification 3 differs from modification 1 only by the structure of the cover member. In modification 3, a plate-shaped member 360 is connected around the recess 108d formed in the lead portion 108b through a bonding layer 361. The bonding layer 361 may be formed into an annular shape so that no bonding layer 361 is disposed in a portion facing the irregularity-formed portion 108x. The plate-shaped member 360 and the irregularity-formed portion 108x are spaced apart from each other in the thickness direction of the lead portion 108b. Preferably, the plate-shaped member 360 is made of a resin.

[Cover Member]

No particular limitation is imposed on the material and shape of the cover member. The cover member may be made of a resin, a ceramic, or a metal. The cover member may have, for example, a sheet shape, a plate shape, or a block shape. The cover member may be connected to the current collector by bonding, welding, fitting, etc.

[Ultrasonic Bonding]

No particular limitation is imposed on the conditions for ultrasonically bonding a current collector and a core-stacked portion together. For example, a horn load of 1,000 N to 2,500 N (100 kgf to 250 kgf), a frequency of 19 kHz to 30 kHz, and a bonding time of 200 ms to 500 ms may be used for the ultrasonic bonding. When the frequency is 20 kHz, the horn amplitude may be set to 50% to 90% of the maximum amplitude (e.g., 50 μm). Preferably, by applying ultrasonic vibrations to the core-stacked portion, an oxide film on the surface of the core included in the core-stacked portion and an oxide film on the surface of the current collector are removed by friction, and the stacked layers of the core are solid-phase bonded together, and the core and the current collector are solid-phase bonded together.

<Others>

In the above embodiment and modifications 1 to 3, the structures of the negative electrode current collector, the method for joining the negative electrode current collector and the negative electrode core-stacked portion, etc. have been described in detail. The structure of the positive electrode current collector, a method for joining the positive electrode current collector and the positive electrode core-stacked portion, etc. may be the same as above.

The concept of the disclosure is applied to at least one of the positive electrode side or the negative electrode side.

In the above embodiment and modifications 1 to 3, prismatic secondary battery including the flattened wound electrode assembly has been exemplified, but this is not a limitation. The electrode assembly may be a stacked-type electrode assembly in which a plurality of positive electrode plates and a plurality of negative electrode plates are stacked alternately with a separator therebetween. In the stacked-type electrode assembly, a plurality of rectangular core-exposed portions stacked one on another may form a core-stacked portion. In the wound electrode assembly also, a plurality of rectangular core-exposed portions stacked one on another may form a core-stacked portion. The wound electrode assembly may be disposed in the battery case such that the winding axis is perpendicular to the sealing plate. The positive electrode core-stacked portion and the negative electrode core-stacked portion may be disposed in a sealing plate-side edge portion of the electrode assembly.

When the positive electrode core is made of aluminum or an aluminum alloy, the thickness of the positive electrode core is preferably 5 to 30 μm and more preferably 10 to 20 μm. The number of layers of the positive electrode core stacked in the positive electrode core-stacked portion is preferably 10 to 100 and more preferably 30 to 100. No particular limitation is imposed on the thickness of the positive electrode active material layer, but the thickness is, for example, preferably 10 to 500 μm.

When the negative electrode core is made of copper or a copper alloy, the thickness of the negative electrode core is preferably 5 to 30 μm and more preferably 6 to 15 μm. The number of layers of the negative electrode core stacked in the negative electrode core-stacked portion is preferably 10 to 100 and more preferably 30 to 100. No particular limitation is imposed on the thickness of the negative electrode active material layer, but the thickness is, for example, preferably 10 to 500 μm.

Well-known materials may be used for the positive electrode plate, the negative electrode plate, the separator, the electrolyte, etc.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
   a first electrode plate;
   a second electrode plate having a polarity different from a polarity of the first electrode plate;
   an electrode assembly including the first electrode plate and the second electrode plate;
   a first electrode current collector electrically connected to the first electrode plate; and
   a cover member,
   wherein the first electrode plate includes a first electrode core and a first electrode active material layer formed on the first electrode core,
   wherein the electrode assembly includes a first electrode core-stacked portion in which the first electrode core is stacked,
   wherein the first electrode core-stacked portion is joined to a first surface of the first electrode current collector to thereby form a joined portion,
   wherein the first electrode current collector has an irregularity-formed portion that is formed on a second surface opposite to the first surface, such that the irregularity-formed portion and the joined portion are located opposite each other in a direction of a thickness of the first electrode current collector, and wherein the cover member is disposed on the second surface so as to cover the irregularity-formed portion, wherein the cover member and the irregularity-formed portion are spaced apart from each other in the direction of the thickness of the first electrode current collector, wherein the cover member is bonded to the first electrode current collector through a bonding layer, and wherein the bonding layer has an annular shape and is disposed so as to surround the irregularity-formed portion.

2. The secondary battery according to claim 1, wherein a recess is formed on the second surface of the first electrode current collector, wherein the irregularity-formed portion is formed on a bottom surface of the recess, and wherein the cover member is connected around the recess.

3. The secondary battery according to claim 1, wherein the first electrode core is made of copper or a copper alloy, and wherein the first electrode current collector is made of copper or a copper alloy.

4. A method for producing a secondary battery including a first electrode plate, a second electrode plate having a polarity different from a polarity of the first electrode plate, an electrode assembly including the first electrode plate and the second electrode plate, a first electrode current collector electrically connected to the first electrode plate, and a cover member, wherein the first electrode plate includes a first electrode core and a first electrode active material layer formed on the first electrode core, the method comprising:

an electrode assembly production step of producing the electrode assembly having a first electrode core-stacked portion in which the first electrode core is stacked;

an ultrasonic bonding step of sandwiching the first electrode core-stacked portion and the first electrode current collector between an anvil and a horn and then ultrasonically bonding the first electrode core-stacked portion and the first electrode current collector together, wherein an irregularity-formed portion is formed in a portion of the first electrode current collector, the portion being brought into contact with the anvil; and a cover member connecting step of, after the ultrasonic bonding step, connecting the cover member to the first electrode current collector such that the cover member covers the irregularity-formed portion, wherein, in the cover member connecting step, the cover member is connected to the first electrode current collector such that a gap extending in a direction of a thickness of the first electrode current collector is formed between the cover member and the irregularity-formed portion, wherein the cover member is bonded to the first electrode current collector through a bonding layer, and wherein the bonding layer has an annular shape and is disposed so as to surround the irregularity-formed portion.

5. The method for producing a secondary battery according to claim 4, wherein the first electrode current collector has a recess formed on a surface thereof on which the irregularity-formed portion is formed, wherein the irregularity-formed portion is formed on a bottom surface of the recess, wherein the cover member is disposed so as to cover the recess, and wherein the cover member is connected around the recess.

6. The method for producing a secondary battery according to claim 4, wherein the first electrode core is made of copper or a copper alloy, and wherein the first electrode current collector is made of copper or a copper alloy.

* * * * *